US006912577B1

United States Patent
Sabatier et al.

(10) Patent No.: US 6,912,577 B1
(45) Date of Patent: Jun. 28, 2005

(54) PROCESS FOR ESTABLISHING COMPUTER NETWORK COMMUNICATION USING A TELEPHONE MESSAGE INCORPORATING A TWO-PART COMPUTER NETWORK ADDRESS

(75) Inventors: Pierre Sabatier, Cergy Saint Christophe (FR); Louis Bède Omgba, Jouy le Moutier (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/488,769

(22) Filed: Jan. 21, 2000

(30) Foreign Application Priority Data

Jan. 22, 1999 (FR) ............................................. 99 00700

(51) Int. Cl.⁷ ............................ G06F 15/16; H04M 3/42
(52) U.S. Cl. ....................... 709/227; 709/204; 709/205; 379/202.1
(58) Field of Search ................................. 709/204, 205, 709/206, 227, 230, 249, 228, 229; 370/353, 356, 252, 352, 396, 354; 379/202.1, 88.17, 88.22, 215.01; 235/494; 340/825.52

(56) References Cited

U.S. PATENT DOCUMENTS

| | | | | |
|---|---|---|---|---|
| 5,940,598 A | * | 8/1999 | Strauss et al. ............... 709/249 |
| 5,974,043 A | * | 10/1999 | Solomon ...................... 370/352 |
| 6,052,372 A | * | 4/2000 | Gittins et al. ................ 370/396 |
| 6,164,547 A | * | 12/2000 | Vapaakoski et al. ......... 235/474 |
| 6,169,796 B1 | * | 1/2001 | Bauer et al. ............ 379/215.01 |
| 6,175,565 B1 | * | 1/2001 | McKinnon et al. .......... 370/354 |
| 6,181,695 B1 | * | 1/2001 | Curry et al. ................. 370/356 |
| 6,219,710 B1 | * | 4/2001 | Gray et al. .................. 709/227 |
| 6,226,678 B1 | * | 5/2001 | Mattaway et al. ........... 709/230 |
| 6,272,214 B1 | * | 8/2001 | Jonsson ................... 379/202.01 |
| 6,324,264 B1 | * | 11/2001 | Wiener et al. ............ 379/88.22 |
| 6,346,890 B1 | * | 2/2002 | Bellin ..................... 340/825.52 |
| 6,356,533 B1 | * | 3/2002 | Bruno et al. ................. 370/252 |
| 6,377,570 B1 | * | 4/2002 | Vaziri et al. ................. 370/352 |
| 6,424,647 B1 | * | 7/2002 | Ng et al. ..................... 370/352 |
| 6,470,010 B1 | * | 10/2002 | Szviatovszki et al. ...... 370/356 |
| 6,529,501 B1 | * | 3/2003 | Zhao et al. .................. 370/353 |
| 6,748,057 B2 | * | 6/2004 | Ranalli et al. ............ 379/88.17 |

FOREIGN PATENT DOCUMENTS

| | | |
|---|---|---|
| DE | 99 13633 | 3/1999 |
| EP | 0 817 452 A2 | 1/1998 |
| WO | 97 31492 | 8/1997 |
| WO | 98 37665 | 8/1998 |

* cited by examiner

Primary Examiner—John Follansbee
Assistant Examiner—Kenny Lin
(74) Attorney, Agent, or Firm—Quarles & Brady LLP

(57) ABSTRACT

A process for establishing communication, on the INTERNET (3) between two devices (1, 2) in which one of the two devices (1) calls the other (2) on a telephone network to invite it to communicate on the INTERNET by transmitting a message including a computer address having a first part designating a server (31) for communicating with the first device (1) and the second device (2) on the computer network (3), and the computer address having a second part corresponding in particular to the first device when said first device (1) is communicating with said server (3) the calling device (1) also connecting itself to the INTERNET (3) to receive the computer address for incorporation in the message, and the called device (2) connecting itself to the INTERNET (3) for establishing communication with the calling device.

7 Claims, 1 Drawing Sheet

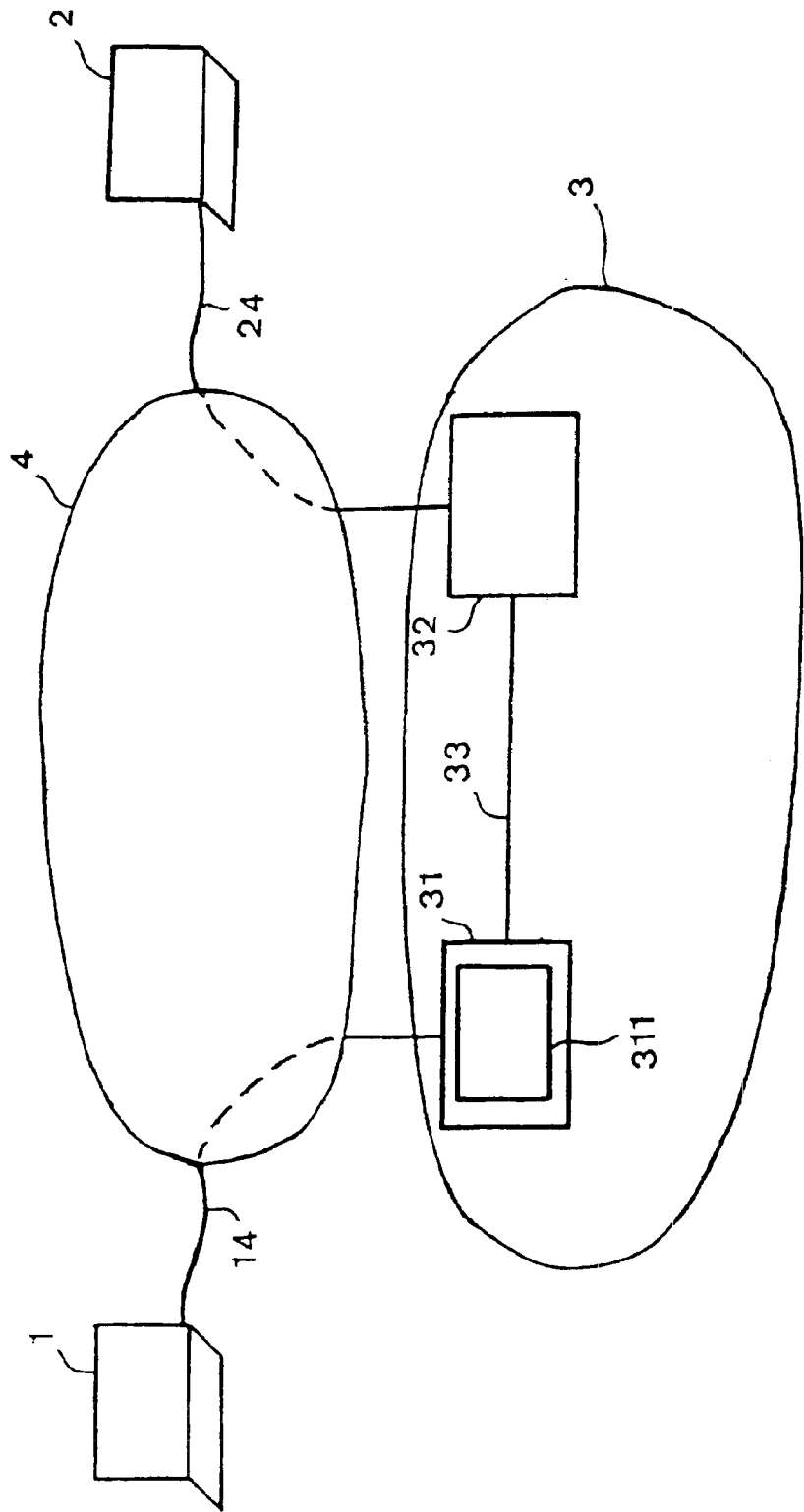
FIGURE

PROCESS FOR ESTABLISHING COMPUTER NETWORK COMMUNICATION USING A TELEPHONE MESSAGE INCORPORATING A TWO-PART COMPUTER NETWORK ADDRESS

BACKGROUND OF THE INVENTION

A computer network of the INTERNET type is well suited to the exchange of data between a computer terminal and a server dialed up by the latter using the address of the server in the network.

As there are a large number of terminals, it is not possible to allocate to each of them a definitive address, so that each of them has an address assigned to it, temporary and variable from one call to the next, only when it initiates a call, that address being communicated to the server for response purposes.

Thus, the number of addresses remains limited to the number of permanent addresses, those of the server, and the temporary addresses of active machines in the process of calling.

For this reason, terminals at rest cannot be located and therefore dialed up, since they are unknown to the network through lack of address. In particular, it is not possible to establish direct telephone communication over the INTERNET, to transmit information, such as voice or data.

The present invention aims to solve this problem of access to a terminal of any other information-transmitting device.

SUMMARY OF THE INVENTION

To this end, the invention concerns a process for establishing a communication, on a computer network of the INTERNET type, between two devices and on a telephone network, in which:

one of the two calling devices calls the other on the telephone network to invite it into the said communication by giving it a message with references for addressing on the computer network, the calling device connects itself to the first, computer network to receive an IP1 computer address and incorporates it into the aforesaid message, and the called device connects itself to the first, computer network, accesses the aforesaid message, obtains the IP1 computer address of the device calling and establishes the aforesaid communication.

The term 'message' is used here to mean any body of information which can be transmitted across the computer network, whatever the presentation of this information, which may therefore in particular represent alphanumerical characters as well as fax type images.

The message, still accessible via the computer network, has the function of a site representing the calling device, the references transmitted by the invitation to make communication sent by the latter being in fact a link in order to access the message. The telephone network serves as a signaling network for the computer network, in order to transmit that link, and thus makes it possible to demand that a device, deliberately, when another device wishes to enter into communication with it via the computer network.

It is of advantage for the calling device to transmit a secret code word, which the latter subsequently retransmits, via the first, computer network, to the calling device so that the latter agrees to enter into communication.

In this way, protection is assured against any attempt to substitute the called correspondent, following computer hacking.

BRIEF DESCRIPTION OF THE DRAWING

The invention will be better understood with the aid of the following description of a preferred mode of implementation of the process of the invention, with reference to the single FIGURE in the appended drawing, which is a diagrammatic representation of information-transmitting terminals connected to the switched telephone network STN, and to the INTERNET, in which there are two INTERNET service providers.

DETAILED DESCRIPTION OF THE PREFERRED EMBODIMENT

In the FIGURE, two information-transmitting terminals 1 and 2 are represented which, in addition to the classic circuits for a data link with the INTERNET network 3, via telephone lines 14, 24 respectively, also have in this example a microphone and a loudspeaker and circuits allowing vocal communication to be established. This vocal communication may here be established via the switched telephone network 4, with digital conversion upon entering the network 4 and reconversion to analogue upon exit from the network 4. If the network 4 was an integrated services fully digital network (IDSN), terminals 1 and 2 would themselves ensure the above conversions by codecs. In addition, terminals 1, 2 can exchange between themselves, across the INTERNET 3, packets of digital, coded vocal signals in compression, which are decompressed and decided upon reception to be restored on the loudspeaker or a receiver.

The INTERNET 3 has two providers of access 31, 32 to the INTERNET, also connected to the STN 4, to which the users of terminals 1 and 2 are respectively subscribed, these users being able (broken lines) to reach their respective service providers 31, 32 via their lines 14, 24, of the STN 4. The INTERNET link 33 connecting the to service providers 31, 32 illustrates a classic temporary link on the INTERNET 3 allowing terminals 1 and 2 to be connected together through their lines 14 and 24. In practice, there are many such terminals.

The software architecture of terminals 1 and 2 is inspired by the recommendation H 323 of the ITU with , at the top of level 7 in the OSI (Open Systems Interconnection) classification, an application relating here to telephony across the INTERNET 3.

Below, and up to a command circuit for a data exchange modem, are two channels for data processing OSI layers, one for signaling and the other for useful data, in this case vocal signals in the form of packets.

The service provider 31 has a memory 311 which it places at the disposal of terminal 1, with respect to its writing, memory 311 which is accessible for reading purposes from any device on the INTERNET 3, providing that device supplies the memory address information necessary to retrieve a specific electronic document from the memory 311.

Terminal 1 thus has available, through the intermediary of the service provider 31, a section of the memory 311 which is the functional equivalent of an INTERNET site, and which can therefore be consulted by and other terminal.

In a general way, the memory 311 may be installed in any location whatever, perhaps remote from the service provider 31, to the extent that the latter serves as intermediary designed to allow access to that memory 311. The latter could therefore be situated in a computer center, or even with another service provider, with the service provider 31 establishing an INTERNET link, for instance, when access to the memory 311 is required.

The process of establishing a communication between terminals 1 and 2 will now be explained.

Generally, the establishment of a communication, on the first, computer network 3 of INTERNET type, between two devices, here the terminals 1 and 2 of this first, computer network 3 and of the second, telephone network 4, involves the following steps:

one of the two calling devices 1 dials up the other 2 on the second, telephone network 4 to invite it into the said communication by giving it the references of a message accessible on the computer network 3, the calling device 1 connects itself to the first, computer network 3, receives an IP1 computer address and incorporates it into the aforesaid message, and the called device, 2, connects itself to the first, computer network 3, accesses the aforesaid message, obtains the IP1 computer address of the calling device 1 and established the aforesaid communication.

The above process thus avoids the necessity of a rendez-vous or communication server, by inviting terminal 2 to consult the message at the memory-site 311 containing the up-to-date IP1 address.

The IP31 or URL address information of the access provider 31 may be a classic INTERNET address or simply a reference allowing the latter to be retrieved, for instance the name of the service provider, in order to access the message, to write it and read it, via the provider.

In that example, terminal 1 composes the electronic mail in the form of at least one HTML page on which is included a marker specifying the position of the IP1 computer address on the page. In that example, it is a question of a command character, invisible on a screen.

In order to avoid establishing a communication via the INTERNET 3 between two terminals 1 and 2 which would not be compatible, at the time of the call via the telephone network 4 the two terminals 1 and 2 exchange signals verifying their compatibility for communication across the INTERNET 3. For this purpose, the CCITT Q931 protocol is used here. A secret code word is transmitted by terminal 1 to terminal 2, which the latter subsequently retransmits, via the INTERNET 3, to terminal 1 so that the latter agrees to enter into communication.

In addition, the signals contain an identifier N1 for the terminal 1 calling via the telephone network 4, which allows terminal 2, or its user reading these signals on a terminal 2 display, perhaps to refuse to establish the sought for INTERNET communication. The identifier is, for instance, the telephone number N1 of terminal 1, issued by the CLASS service of the telephone network 4.

In particular, it can be arranged that terminals 1 and 2 automatically establish communication between each other and each then activates warning mechanisms such as a bell of indicator light, to inform the users of devices 1 and 2.

In even greater detail, in this example terminal 1, calling terminal 2 via the STN 4, issues a signal CNGa at 1300 Hz which terminal 2 recognizes, here without activating its bell, and it replies by continuous emission of a signal at 1300 Hz followed by a V21 identification frame containing a terminal 2 identifier, such as the serial number and manufacturer. Terminal 1 replies with an NSC frame which contains an identifier for terminal 1, the IP31 computer address of the server 31, the name of a directory and an HTML page file name together with the secret authentication code. Terminal 2 executes acceptance of this data by emitting a DCN frame and the two terminals 1, 2 "hang up" to free their lines 14, 24.

Terminal 1 calls its service provider 31 and edits an HTML page, with the name XX of the directory and a name YY of the file for the message of the page and the IP1 computer address which it has obtained from the service provider 31, and sends the HTML message to the provider 31 who places it in the memory 311 in a section specified by the name XX of the directory above, transmitted to terminals 1.

It will be noted that the telephone call from terminal 1 to terminal 1 may take place after dispatch of the HTML page to the service provider 31, but it is also possible for the calling terminal 1 to dial up the other terminal 2 first of all on the second, telephone network 4, prior to connecting itself to the first telephone network, INTERNET 3, providing there is no risk of terminal 2 calling the service provider 31 too quickly since it does not yet have the HTML page, or if it is not up to date with respect to the IP1 address. In a particular instance, terminal 1 may however have instructed terminal 2 not to call until after a delay or a specified time.

In practice, the message on the HTML page may be retained permanently in the memory 311 and the service provider simply updates the Ip1 address, perhaps automatically, each time it provides a new IP1 address to terminal 1 which it calls it.

The service provider 32, here has a classic role, in contrast to the service provider 31. Terminal 2 calls the later using the INTERNET 3, via its service provider 32 and sends it the IP31 address to establish a link such as that bearing the reference 33. Once the service provider 31 has been reached by terminal 2, the latter sends it the memory address information of reference (name XX of the directory and name YY of the file) previously received from terminal 1 via the STN 4 for reading access to the HTML page deposited in the memory 311 by terminal 1. The message reference transmitted from terminal 1 to terminal 1 may simply indicate a message, the address of which is already known to terminal 2.

When terminal 2 then calls terminal 1, that amounts in fact simply to extending the link 33, already established with the service provider 31, to line 14. Terminal 2 then sends its address IP2 to terminal 1. In practice, as the service provider 31 has already received this computer address IP2 from terminal 2 to communicate with the latter, that amounts to ordering the server 31 to communicate the IP2 address to terminal 1. This command may originate from terminal 2 of from terminal 1, perhaps by the sole fact of the service provider 31 being called by one or other terminals 1, 2. Terminal 2 at least then has at its disposal in all cases the IP1 computer address of the other terminal 1 and may therefore communicate with it. Terminals 2 then sends to the IP1 address a SETUP signal with its IP2 address and the secret code word to authenticate the authentication code work and terminal 2 replies with a CONNECT-ACK signal of agreement, followed by an exchange of packets of useful data, such as voice or computer data such as faxes, or electronic mail.

What is claimed is:

1. Process for establishing computer network communication between a first device and a second device each not having permanent computer IP addresses on an Internet computer network, wherein the first device and the second device are also operable on a telephone network, the process comprising:

the first device calling the second device via the telephone network to invite the second device to initiate the computer network communication by transmitting the second device an invitation message via the telephone network, the invitation message including references of an Internet message accessible on the computer network, wherein the references point to a specific location on the computer network;

the first device connecting to the computer network to receive a temporary computer IP address, incorporating said temporary computer IP address into the Internet message, and storing said Internet message at said specific location on the computer network;

the second device connecting to the computer network, using the references of the Internet message to access the Internet message located at said specific location on the computer network, obtaining the temporary computer IP address of the first device and using the temporary computer IP address of the first device to establish said computer network communication with the first device; and wherein during the call via the telephone network, the first device and the second device exchange signals to verify their compatibility for communication across the computer network.

2. Process in accordance with claim 1, which the first device, calling the second device via the telephone network, sends the second device a secret code word, which the second device subsequently retransmits via the computer network to the first device, so that the first device may agree to establish communication on the computer network.

3. Process in accordance with claim 1, in which the first device calls the second device via the telephone network prior to connecting to the computer network.

4. Process accordance with claim 3, in which the first device, calling the second device via the telephone network, sends the second device a secret code word, which the second device subsequently retransmits via the computer network to the first device so that the first device may agree to establish communication on the computer network.

5. Process in accordance with claim 1, in which the signals contain an identifier of the first device.

6. Process in accordance with claim 1, in which the first device connects to the computer network receives said temporary computer IP address and incorporates the temporary computer IP address into the Internet message accessible on the computer network, prior to calling the second device via the telephone network.

7. Process in accordance with claim 6, which the first device, calling the second device via the telephone network, sends the second device a secret code word, which the second device subsequently retransmits via the computer network to the first device so that the first device may agree to establish communication on the computer network.

* * * * *